United States Patent
Alzieu et al.

(10) Patent No.: US 6,489,743 B1
(45) Date of Patent: Dec. 3, 2002

(54) METHOD FOR CONTROLLING AN ELECTRIC POWER PLANT ASSOCIATED WITH A TEMPORALLY RANDOM POWER SOURCE

(75) Inventors: Jean Alzieu, Moret sur Loing (FR); Jean-Claude Camps, Misy sur Yonne (FR); Hassan Smimite, Le Mee sur Seine (FR)

(73) Assignee: Electricite de France (Service National) (FR)

( * ) Notice: Subject to any disclaimer, the term of this patent is extended or adjusted under 35 U.S.C. 154(b) by 0 days.

(21) Appl. No.: 09/743,203
(22) PCT Filed: Jul. 2, 1999
(86) PCT No.: PCT/FR99/01592
§ 371 (c)(1), (2), (4) Date: Mar. 26, 2001
(87) PCT Pub. No.: WO00/02300
PCT Pub. Date: Jan. 13, 2000

(30) Foreign Application Priority Data

Jul. 3, 1998 (FR) .............................. 98 08531

(51) Int. Cl.[7] .............................................. H01M 10/44
(52) U.S. Cl. ...................................................... 320/102
(58) Field of Search ................................. 320/101, 102

(56) References Cited

U.S. PATENT DOCUMENTS 4,847,546 A * 7/1989 Bobier et al. ............... 320/102
5,196,781 A * 3/1993 Jamieson et al. ........... 320/102

* cited by examiner

*Primary Examiner*—Edward H. Tso
*Assistant Examiner*—Pia Tibbits
(74) *Attorney, Agent, or Firm*—Blakely Sokoloff Taylor & Zafman

(57) ABSTRACT

The method serves for the control of an electric power plant (2) associated with a power source (6) with temporally random availability, the plant comprising at least one battery (10) adapted to be supplied with electric current from the source. When the random power (6) is available, the battery (10) current supply is controlled. The supply is controlled so as to come as close as possible to a state of complete charge of the battery, and preferably to reach this state.

20 Claims, 2 Drawing Sheets

METHOD FOR CONTROLLING AN ELECTRIC POWER PLANT ASSOCIATED WITH A TEMPORALLY RANDOM POWER SOURCE

BACKGROUND

1. Field of the Invention

The invention relates to electric power plants comprising at least one battery adapted to be supplied with electric power from a power source with temporally random availability.

2. Description of the Related Art

Such plants are known which comprise a battery adapted to be recharged with current by means of photovoltaic panels. The energy (power) available in a temporally random manner is then solar radiation. These plants are used in particular in developing countries, in regions having no local or national electricity supply network. Usually, to control the charging and discharging of the battery, the voltage across the terminals of the battery is monitored and a predetermined top voltage threshold and a predetermined bottom voltage threshold are used. Thus, when the voltage across the terminals reaches the bottom threshold, the users are disconnected so as to safeguard the battery from excessive discharging. Once the voltage across the terminals reaches the top threshold, the battery is disconnected from the panels and, after a timeout of a few minutes, the battery is made available for the delivery of current by reestablishing the connection with the users. An advantage of this device is its simplicity.

However, such a method of control has numerous drawbacks. Firstly, in practice there is no strict correlation between the instantaneous voltage across the terminals of the battery and its state of charge. In particular, it is possible for the voltage to be high while the charge of the battery is very low.

Moreover, the battery conventionally comprising several subassemblies each adapted to receive and to output an electromotive force, it is frequently the case that when the top threshold is reached, the charge of the battery is distributed in a very unequal manner between its various subassemblies. Hence, one of the subassemblies might thereafter reach by priority its deep discharge threshold and might overdischarge throughout the period required for the discharging of the other subassemblies. Now, a subassembly which remains deeply discharged for too long will experience a great reduction in its lifetime, so that it is a fifth or a sixth thereof for example, this correspondingly shortening the lifetime of the battery.

Furthermore, theoretically, the step of complete charging of each subassembly comprises in particular, in the case of open batteries, a phase of heterogenization of the electrolyte followed by a phase of homogenization: in the course of the first phase of the charging, concentrated electrolyte firstly gradually fills the porous electrodes of the subassembly, then seeps out of these electrodes in the form of a heavy viscous acid which runs down the electrodes and accumulates at the bottom of the bath. This therefore results in a stratification of the electrolyte: the electrolyte concentration becomes high at the bottom of the bath and low at the top of the bath, hence the expression "heterogenization". During the second phase, the current received by the battery is apportioned into a charging current proper and into an electrolysis current producing oxygen at the positive electrodes and hydrogen at the negative electrodes. The continued charging of the battery therefore causes a release of gas in the bath, thereby causing forced convection of the electrolyte. This results in gradual homogenization of the electrolyte whose concentration ultimately becomes uniform again throughout the height of the bath. The heterogenization phase is sometimes referred to as the "charging" phase, and the homogenization phase as the "overcharging" phase. However, at the termination of the heterogenization phase, charging is incomplete and the homogenization phase is merely the continuance of charging so as to obtain complete charging. The use of a top voltage threshold to stop the charging causes the homogenization phase to be shortened and often even to be absent. In this way, a heterogenization (stratification) phase without subsequent complete rehomogenization occurs during each charging period. Consequently, the layers of acid accumulate gradually and irreversibly at the bottom of the bath during the life of the battery. Hence, only the bottom parts of the electrodes participate in the operation of the battery. This leads to their rapid destruction and considerably reduces the lifetime of the electrodes and of the battery.

One sometimes attempts to alleviate these drawbacks by overdimensioning the battery. The effective lifetime of the battery is then longer than that of a more modest battery. Nevertheless, this effective lifetime is substantially reduced relative to that normally envisaged for the battery.

SUMMARY

One object of the invention is to provide a method for controlling an electric power plant of the aforesaid type, allowing better knowledge of the effective state of charge of the battery and making it possible to increase the lifetime of the plant without overdimensioning it.

With a view to achieving this object, there is provided according to the invention a method for controlling an electric power plant associated with a power source with temporally random availability, the plant comprising at least one battery adapted to be supplied with electric current from the source, in which method, when the random power is available, the battery current supply is controlled, doing so so as to come as close as possible to a state of complete charge of the battery, and preferably to reach this state.

Thus, the search for the obtaining of the state of complete charge makes it possible to avoid any uncertainty relating to the correlation between the voltage measured across the terminals and the actual state of charge. Once complete charge has been reached, the continuous measurement of the current delivered or received by the battery makes it possible to know at any instant its effective charge with good accuracy.

Moreover, the state of complete charge implies that each of the subassemblies of the battery has also reached its state of complete charge. Subsequently, there is therefore no longer any need to fear premature total discharge on one of the subassemblies, thus making it possible to safeguard the lifetime of the battery.

Furthermore, the complete charging ensures that the phase of heterogenization of the electrolyte has been followed by a phase of sufficient rehomogenization of this electrolyte. This prolongs the lifetime of the electrodes and hence that of the battery.

Finally, the invention avoids the need to resort to an overdimensioning of the plant, which would generate excessive costs.

Advantageously, after the battery has been supplied so as to have received a quantity of electricity above a first predetermined threshold and in particular when the random power is not available, the plant is controlled in such a way that delivery of current by the battery is disabled.

Preferably, the threshold will be below or equal to the partial state of charge after which the electrolyte begins to seep out of the electrodes. Advantageously, this threshold will be as close as possible to this limit. This threshold has a particular value for each type of battery. In certain cases it corresponds to 5% of the nominal capacity of the battery.

Thus, under the aforesaid conditions, the subsequent continuance of the charging phase is favored over the immediate delivery of current. For example, if the phase of heterogenization of the bath has been interrupted for lack of random power, a bid for immediate considerable delivery of current would lead under the effect of the stratification to deep discharging and hence to the fatiguing of the lower parts of the electrodes. It is therefore preferred rather to preserve the battery state for the subsequent resumption of the charging phase causing the continuance of the heterogenization and then the complete rehomogenization of the bath. The lifetime of the battery is thus lengthened.

Advantageously, after the battery has been supplied so as to have received a quantity of electricity below the first threshold and when a delivery of current is requested, the delivery of current by the battery is enabled.

The first threshold is preferably chosen as stated above. Thus, the discharging of the battery is enabled so long as the heterogenization phase has not yet started, namely so long as, at the start of charging, the electrolyte accumulates in the electrodes without seeping out of them. The discharging of the battery does not then cause heterogeneous operation and can be allowed. This involves a limitation to the common control regime stated in the general definition of the invention. This common regime (priority search for the state of complete charge) is preferably limited to the cases where the battery oversteps the first threshold.

This mode of discharge will subsequently be referred to as "microcycling". It is advantageous for several reasons: it makes it possible to reduce the frequency of the complete cycles of the battery. Moreover, the energy yield obtained is high, the concentration of the electrolyte in the porous volume of the electrodes being high.

Advantageously, after the battery has delivered current so as to reach a state of partial nonzero charge, and when the random power is available, the plant is controlled in such a way that current supply to the battery is enabled until it has received a quantity of electricity equal to the first threshold.

Thus, the phase of discharging to the limit of the first threshold is combined with a phase of charging which follows it. Within this limit, it is thus possible to alternate the successive chargings and dischargings so as to make the microcycling last longer.

Advantageously, the plant comprising at least two batteries, in particular which are adapted to be connected in parallel one with respect to the other, after the two batteries or at least two of the batteries have reached a state of partial charge below a second predetermined threshold and when the random power is available, the plant is controlled in such a way that a single first of these batteries is supplied first until it reaches a state of partial charge equal to the second threshold.

Preferably, the second threshold corresponds to the limit between the heterogenization phase and the homogenization phase, or at the very least, is as close as possible to this limit. Its exact value depends on the type of battery. Thus, one favors the supplying of the batteries with current one after the other until the heterogenization phase is completed for the first battery, this phase enabling a larger intensity of current than the homogenization phase which follows it.

Advantageously, after the first battery has reached the second threshold and when the random power is available, the plant is controlled in such a way that the first battery and the or another of the batteries having a state of partial charge below the second threshold are supplied simultaneously.

Thus, after the heterogenization phase has been completed on a battery, the same is done on another battery whilst performing the homogenization phase on the first battery. Thus, the number of batteries in the state of complete charge is optimized when the availability of the random power ceases, for example in the case of solar power, at the end of the day. Hence, after the period of availability, the quantity of stored energy available for the delivery of current is optimized.

Advantageously, when the random power is available, the plant is controlled in such a way that, according to the following order of decreasing priorities:

when the or at least one of the batteries has received a quantity of electricity below the first threshold, the or successfully each of these batteries is supplied until it has received a quantity of electricity equal to the first threshold;

when the or at least one of the batteries has a state of partial charge above the second threshold, the or successively each of these batteries is supplied until it reaches a state of complete charge; and when the or at least one of the batteries has received a quantity of electricity above the first threshold and has a state of partial charge below the second threshold, the or successively each of these batteries is supplied with current until it reaches a state of partial charge equal to the second threshold.

Thus, the order of decreasing priorities is: microcycling, "overcharging", "charging" (that is to say incomplete charging). This mode of implementation of the method is particularly adapted to cases where it is envisaged that the temporally random power will soon cease to be available for a certain period. For example, when dealing with solar power, this corresponds to a meteorological forecast announcing weak sunshine. In this situation, microcycling is favored vis-à-vis the overcharging and charging phases, the energy stored in the battery or batteries being available immediately.

Advantageously, when the random power is available, the plant is controlled in such a way that, according to the following order of decreasing priorities:

when the or at least one of the batteries has a state of partial charge above the second threshold, the or successively each of these batteries is supplied with current until it reaches a state of complete charge;

when the or at least one of the batteries has received a quantity of electricity below the first threshold, the or successively each of these batteries is supplied with current until it has received a quantity of electricity equal to the first threshold; and when the or at least one of the batteries has received a quantity of electricity above the first threshold and has a state of partial charge below the second threshold, the or successively each of these batteries is supplied with current until it reaches a state of partial charge equal to the second threshold.

In this mode of implementation, the decreasing priorities are therefore: overcharging, microcycling, charging. This mode is adapted to the cases where it is envisaged that the random power will not be sufficiently available to accomplish the complete charging of at least one battery.

Advantageously, when the random power is available, the plant is controlled in such a way that, according to the following order of decreasing priorities:

when the or at least one of the batteries has a state of partial charge above the second threshold, the or successively each of these batteries is supplied with current until it reaches a state of complete charge;

when the or at least one of the batteries has received a quantity of electricity above the first threshold and has a state of partial charge below the second threshold, the or successively each of these batteries is supplied with current until it reaches a state of partial charge equal to the second threshold; and when the or at least one of the batteries has received a quantity of electricity below the first threshold, the or successively each of these batteries is supplied with current until it has received a quantity of electricity equal to the first threshold.

Thus, in this mode of implementation, the priorities are: overcharging, charging, microcycling.

It corresponds to envisaged cases other than those stated above. It is therefore adapted to cases where the random power seems to be available for a considerable period of time. For example, for solar power, this is the case of meteorological forecasts indicating strong sunshine during the day.

Advantageously, the plant comprising at least two batteries, in particular which are adapted to be connected in parallel one with respect to the other, when the random power is available and a delivery of current by the plant is requested, the plant is controlled in such a way that current is delivered simultaneously from all the batteries which are not in the charging phase.

Advantageously, after the or one of the batteries has reached a state of zero charge and then goes to the state of complete charge, a quantity of electricity which the battery receives so as to go from the state of zero charge to a state of charge equal to a second predetermined threshold is measured.

Thus, this measurement makes it possible to update the value of the capacity of the battery, this value being liable to vary in the course of the life of the battery. This updating improves the accuracy of the control of the plant, in particular for the tracking of the instantaneous charge of the battery or batteries.

Advantageously, the plant is controlled so as to reach the state of zero charge of the battery.

Thus, the battery is forced to discharge totally with a view to updating the value of its capacity. This operation is performed for example when the total discharging of the battery has not occurred for a predetermined period.

Advantageously, the or at least one of the batteries comprising at least two subassemblies each adapted to receive and to deliver electric current, at least two voltages in series are measured on the battery, each comprising a voltage across the terminals of a respective one of the subassemblies.

Thus, the evolution of the state of charge of each subassembly of the battery is tracked with greater accuracy.

Advantageously, the battery or batteries are furthermore adapted to be supplied with electric current from a power source with temporally definite availability.

The plant may then be referred to as a "hybrid plant".

There is also envisaged according to the invention an electric power plant adapted to be associated with a power source with temporally random availability, the plant comprising at least one battery adapted to be supplied with electric current from the source, and means for controlling the plant, in which the control means are adapted to implement the method according to the invention.

Advantageously, the plant comprising at least two batteries, in particular which are adapted to be connected in parallel one with respect to the other, the plant comprises means for disabling the delivery of current by any one of the batteries to the other or to any other of the batteries.

Advantageously, the plant comprises four batteries.

This number makes it possible to control the phases of charging and of discharging of the batteries as a function of the availability of the temporally random power source and of the demand for current, while reconciling good flexibility and reasonable cost.

BRIEF DESCRIPTION OF THE DRAWINGS

Other characteristics and advantages of the invention will become further apparent in the following description of a preferred embodiment given by way of nonlimiting example. In the appended drawings.

DETAILED DESCRIPTION

Figure 1:
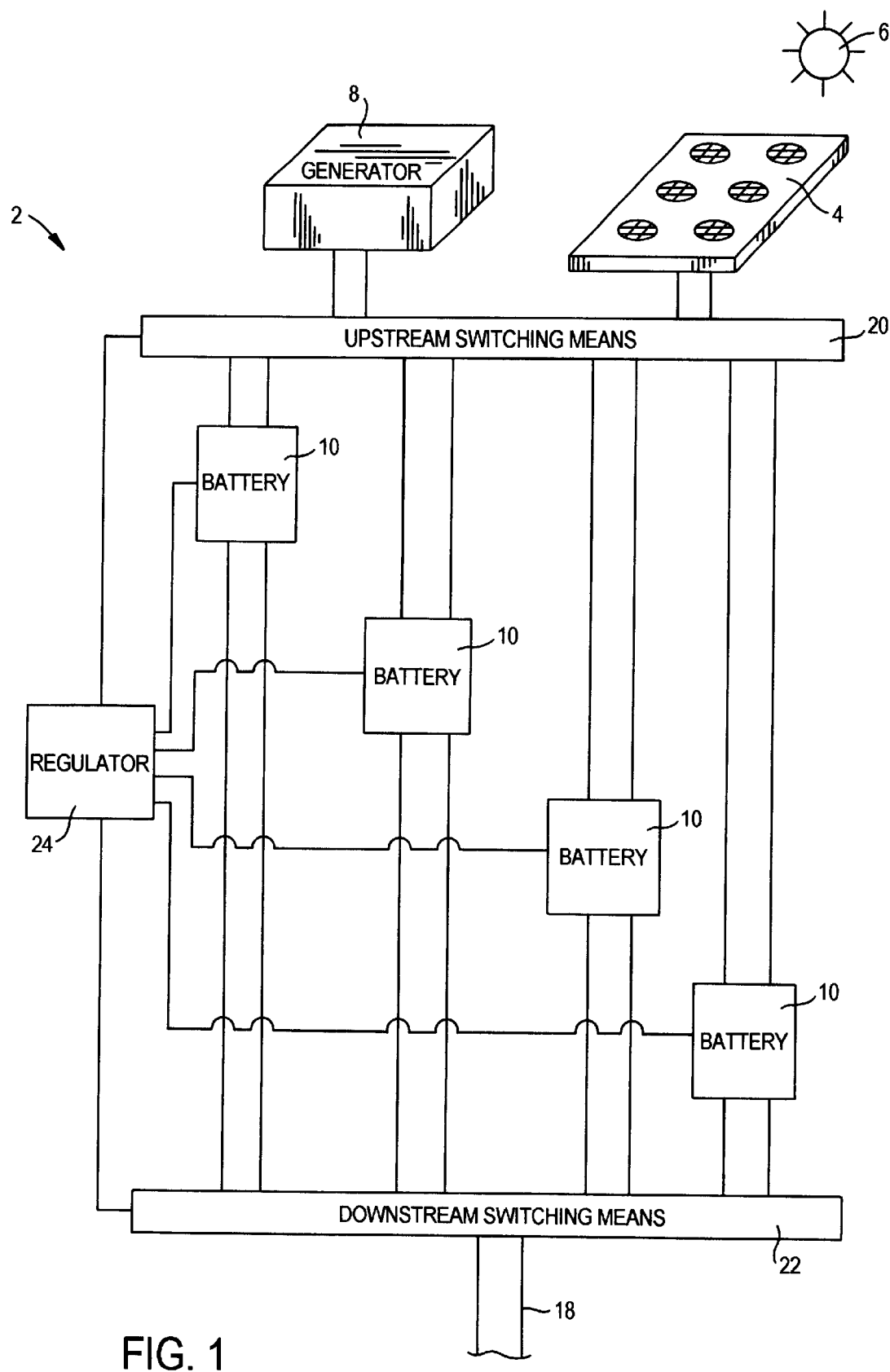
FIG. 1 is a diagrammatic view of an electric power plant according to the invention.
Figure 2:
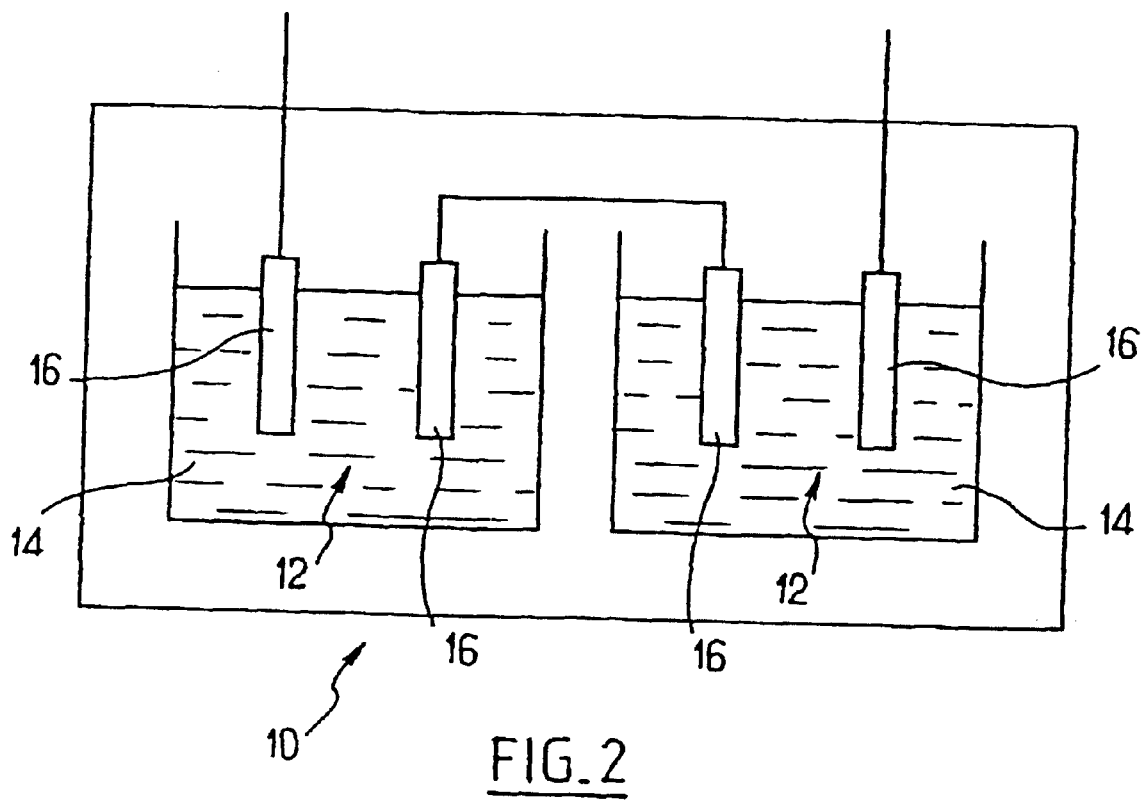
FIG. 2 is a diagrammatic view of one of the batteries of the plant of FIG. 1.

With reference to FIGS. 1 and 2, the electric power plant 2 comprises one or more photovoltaic panels 4 conventionally adapted for converting radiation from the sun 6 into electric current. The plant is thus associated with a power source with temporally random availability. The plant 2 also comprises an electric generator set 8 adapted to be supplied with fuel so as to deliver electric current. Thus, the plant 2 is also associated with a power source with temporally constant availability, it being possible to switch on the electric generator set 8 so as to deliver electric current by day and at night regardless of the meteorological conditions.

The plant comprises several batteries 10, for example two in number, preferably four in number as in this instance. With reference to FIG. 2, each battery comprises several subassemblies 12, just two of which have been represented for greater simplicity, but which may be between 6 and 150 for each battery 10. Each subassembly 12 comprises an electrolyte bath 14 in which are bathed two respectively positive and negative electrode assemblies 16. Each subassembly is adapted to deliver electric current during the discharging thereof and conversely to receive electric current for the charging thereof. In each battery 10, the subassemblies 12 are connected to one another in series.

The plant 2 comprises two terminals 18 for the delivery of an electric current by the plant. It comprises upstream 20 and downstream 22 switching means, of a conventional type. The upstream switching means 20 are connected on the one hand to the electric generator set 8 and to the panel 4, mutually in parallel, and on the other hand to the batteries 10, mutually in parallel. The downstream switching means 22 are connected on the one hand to the batteries 10 mutually in parallel, and on the other hand to the terminals 18. The upstream switching means 20 make it possible to connect by choice the electric generator set 8 and/or the panel 4 to, by choice, one or more of the batteries 10. The downstream switching means 22 make it possible to connect by choice one or more of the batteries 10 to the terminals 18.

The plant 2 comprises a regulator 24 equipped with computer means programmed so as to control the plant according to the method of the invention. To this end the regulator is connected to the upstream switching means 20, to the downstream switching means 22 and to each of the batteries 10. In each of these batteries 10, the regulator 24 is adapted to measure in the battery several voltages in series with one another whose total corresponds to the voltage across the terminals of the battery. Thus, instead of measuring the voltage across the terminals of the assembly of subassemblies 12, a voltage is measured across the terminals of a first section of the subassemblies, another voltage across the terminals of the following section, and so on and so forth. One proceeds thus, dividing the battery 10 into several sections, for example four, which are preferably equal to one another. This method of measurement makes it possible, by comparison, to determine whether a first subassembly 12 has arrived at the state of total discharge.

For each of these batteries 10, the regulator 24 is adapted to measure the quantity of electricity entering the battery during a charging phase or exiting the battery during a discharging phase. This measurement is performed in a conventional manner.

Figure 3:
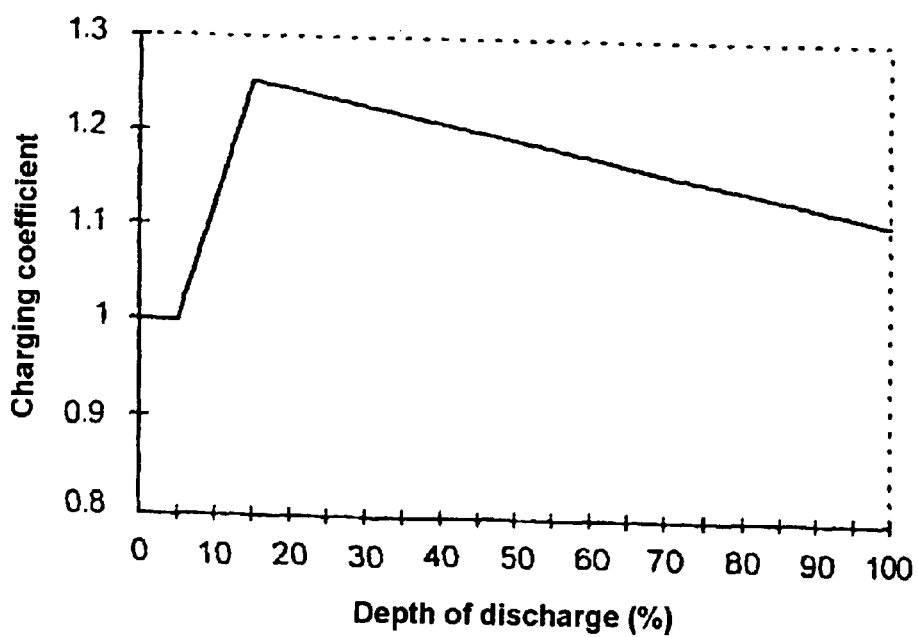
FIG. 3 is an exemplary chart for determining a coefficient "a" usable within the framework of the method according to the invention.

During a charging phase, the regulator 24 therefore knows at each instant the quantity of electricity received by the battery since the start of the charging phase. Moreover, the regulator knows the effective quantity of electricity Q which the battery 10 must receive so as to reach complete charge. This quantity Q is calculated through the following relation:

$$Q = a \times (C \text{ total} - Q \text{ start charge})$$

where:
  "C total" is the effective capacity of the battery in the state of complete charge;
  "Q start charge" is the quantity of electricity in the battery 10 at the onset of the charging phase; and
  "a" is a correction coefficient, referred to conventionally as the "charging coefficient", given by a chart, for example of the type of that of FIG. 3, as a function of the depth of discharge.

At each instant the regulator 24 compares the measured quantity of electricity received by the battery with Q to be reached. It is therefore able to halt the charging phase (disconnection of the battery 10 from the electric generator set 8 or from the panel 4) when the state of complete charge is reached.

The value of "C total" at the start of the life of the battery 10 is its nominal capacity. However, as the battery is used, the effective total capacity of the battery differs from this magnitude. This is why, within the framework of the method according to the invention, when the battery reaches the state of zero charge, the quantity of electricity received by the battery so as subsequently to reach complete charge is measured and calculated by the regulator 24 and becomes the new value of "C total" for the subsequent calculations of Q. The value of the total capacity of the battery is thus updated. In this way, the calculation of the available energy stored in the battery is performed with greater accuracy.

Moreover, when the battery does not reach the state of zero charge for a predetermined period, for example three months, the regulator 24, within the framework of the method according to the invention, discharges the battery in question totally, preferably upon the partial or total discharging of the other batteries (when a delivery of current is requested) so as to reach the state of zero charge. The subsequent phase of complete charging will thus allow forced updating of the value of the total capacity of the battery.

As was seen above, an operation for charging a battery 10 from the state of zero charge to the state of complete charge comprises a phase of "normal charging" and a phase of "overcharging". In the course of normal charging concentrated electrolyte 14 begins to fill the porous electrodes 16. The concentration of electrolyte in the bath then remains homogeneous. Thereafter, the concentrated electrolyte seeps out of the electrodes and runs down them. The concentration of the electrolyte outside the electrodes then becomes heterogeneous. Thereafter, in the course of the "overcharging", the current delivered to the battery 10 is apportioned into a charging current proper and an electrolysis current producing a release of gas at the electrodes 16 and leading to the rehomogenization of the concentration of the electrolyte in the bath.

In the present mode of implementation, the method according to the invention uses two thresholds for monitoring the partial state of charge of a battery. In this instance, the first threshold corresponds to a quantity of electricity received by the battery such that, in the course of the "normal" charging phase, the concentrated electrolyte has finished filling the electrodes 16 and that the onset of heterogenization has not occurred. In practice, the corresponding state of partial charge can be equal to around 5% of the nominal capacity of the battery. The second threshold corresponds here to the state of partial charge of the battery at the end of the "normal charging" and before the onset of "overcharging", that is to say at the end of the heterogenization phase and before the start of homogenization.

In the present mode of implementation, a principle of the method of control is that when the solar power 6 is available, the current supply to a battery 10 is controlled a priori so as to come as close as possible to the state of complete charge and preferably to reach it.

Moreover, after the battery has been supplied so as to have received a quantity of electricity above the first threshold, and when the solar power 6 ceases to be available, the delivery of current by the battery is disabled a priori when a delivery of current is requested from the terminals 18. Specifically, in this situation, the phase of heterogenization of the bath has started and any delivery of current by the battery would lead, under the effect of the stratification of the electrolyte, to the heterogeneous discharging of the electrodes and to the premature fatiguing of the lower parts of the electrodes which, in this case, are the most stressed areas.

On the other hand, after the battery has been supplied so as to have received a quantity of electricity below the first threshold and when a delivery of current is requested, the delivery of current by the battery is enabled a priori. Specifically, the onset of stratification not having occurred, the battery can be discharged so as to satisfy the request and without fear of premature degradation. Henceforth, after the battery has delivered current and when the random power is available, current supply to the battery is enabled so as to reach the first threshold. It is thus possible to alternate the charging and discharging phases to the upper limit of the first threshold. This involves operation in microcycling mode, the advantages of which have been detailed earlier.

Another principle of the present mode of implementation of the method relates to the control of the end of complete charging, or "overcharging" of the batteries when several batteries are candidates for this end. According to this principle, after at least two batteries have reached a state of partial charge below the second threshold, the plant 2 is controlled in such a way that a single first of these batteries 10 is supplied a priori first so as to reach a state of partial charge equal to the second threshold. Thus, the passage of a battery to the second threshold is favored. Thereafter, when the solar power 6 is still available, the plant 2 is controlled in such a way that the first battery 10 and another battery 10 having a state of partial charge below the second threshold are supplied simultaneously. Specifically, the "overcharging" phase requires a small quantity of current. The remainder of the current available can therefore be used for the normal charging of another battery 10.

Consequently, during daytime, when the requirements of users are zero (or covered) and when the panel 4 delivers current (or surplus current), this quantity of current which is not immediately consumed by the users is used on a priority basis for the "overcharging" of one or more batteries 10, by default for the "normal charging" of a battery. Thus, the quantity of energy (power) stored in the batteries at the end of the day is maximized. Furthermore, the priority of microcycling with respect to "charging" and "overcharging" is not fixed, and depends on the circumstances. As a function of the latter, three different modes of operation are envisaged for the control method.

The first mode, taking priority over the following two, is implemented when a battery is in the "overcharging" phase and when the meteorological forecasts indicate that the sunshine will probably be insufficient to terminate the overcharging in progress. In this mode, when the solar power 6 is available, the plant is controlled in such a way that, according to the order of the following decreasing priorities:

when at least one of the batteries 10 has received a quantity of electricity below the first threshold, the or successively each of these batteries is supplied until it has received a quantity of electricity equal to the first threshold. This is microcycling;

by default, when at least one of the batteries has a state of partial charge above the second threshold, the or successively each of these batteries is supplied until it reaches a state of complete charge. This is the overcharging phase;

by default when at least one of the batteries has received a quantity of electricity above the first threshold and has a state of partial charge below the second threshold, the or successively each of these batteries is supplied with current until it reaches a state of partial charge equal to the second threshold. This is the charging phase.

Also, in this first mode of operation, the order of decreasing priority is: microcycling, "overcharging", "normal charging". This first mode makes it possible to obtain the greatest possible benefit from the buffer effected by the microcycling of the batteries, the energy thus stored being immediately available.

The second mode of operation, taking priority over the next, is implemented when a battery is being charged and when the meteorological forecasts indicate that the sunshine for the remainder of the day will be insufficient to accomplish this "normal charging" (with no overcharging). In this case, the order of decreasing priorities is: overcharging, microcycling, charging.

The third mode of operation, implemented by default failing the first two, exhibits the order of the following decreasing priorities: overcharging, charging, microcycling. It is in particular adapted to the case of very favorable meteorological forecasts.

The control of one or the other mode can be performed manually by an action on the regulator 24, by a user who is himself furnished with the meteorological forecasts. Alternatively, the regulator 24 can be adapted to perform meteorological forecasts and to choose one or other mode of operation as a function of these forecasts.

Moreover, in the present mode of implementation of the method, when the solar power 6 is available and a delivery of current by the plant is requested, the plant is controlled in such a way that current is delivered by means of all the batteries which are not in the charging phase, the batteries sourcing in parallel. Thus, for example, current is delivered simultaneously via three batteries 10, the fourth battery 10 being in the "normal charging" phase. Likewise, for example, current is delivered simultaneously via two batteries 10, the other two batteries 10 being in the charging phase, one of them being in the overcharging phase. The plant comprises conventional means (diodes, etc.) for disabling the delivery of current by any one of the batteries 10 to any other of the batteries when several batteries 10 deliver current simultaneously.

The electric generator set 8 serves as a top-up source when the solar energy 6 is not sufficient to cover all the requirements of the consumers. The electric generator set is then switched on so as to supply the network of users. Henceforth, should there be overproduction of current by the set 8, the set serves to supply the batteries 10 according to one of the three aforesaid modes.

For example, this set 8 is switched on when the reserve of the batteries 10 is below a fraction of the forecasts for consumption before sunrise (for example half). Its operation is halted when the energy (power) again available in the batteries 10 is above the forecasts for consumption before sunrise, increased by a predetermined safety margin. The electric generator set 8 is an auxiliary power source. The purpose of the hybrid plant is to satisfy the requirements of all the consumers.

The method and the plant according to the invention can also be used by means of a single power source 6 with temporally random availability, with no top-up source. Hence, it may be necessary to carry out load shedding (rationing of consumption) when the state of charge of the batteries 10 reaches a predetermined bottom limit and when the power, for example solar 6, is unavailable.

The invention can be implemented with other types of power with temporally random availability, for example wind.

It is also possible to contemplate a plant associated with two power sources with temporally random availability, which are different from one another, for example the sun and the wind, and possibly associated with an electric generator set.

What is claimed is:

1. Method for controlling an electric power plant associated with a power source with temporally random availability, the plant comprising at least one battery adapted to be supplied with electric current from the source, in which method, when the random power is available, the battery current supply is controlled, wherein the supply is controlled so as to come as close as possible to a state of complete charge of the battery, and preferably to reach this state.

2. Method according to claim 1, wherein, after the battery has been supplied so as to have received a quantity of electricity above a first predetermined threshold, the plant is controlled in such a way that delivery of current by the battery is disabled.

3. Method according to claim 2, wherein, after the battery has been supplied so as to have received a quantity of electricity below the first threshold and when a delivery of current is requested, the delivery of current by the battery is enabled.

4. Method according to claim 3, wherein, after the battery has delivered current so as to reach a state of partial nonzero charge, and when the random power is available, the plant is controlled in such a way that current supply to the battery is enabled until it has received a quantity of electricity equal to the first threshold.

5. Method according to claim 3, wherein, when the random power is available, the plant is controlled in such a way that, according to the following order of decreasing priorities:

when the or at least one of the batteries has received a quantity of electricity below the first threshold, the or successfully each of these batteries is supplied until it has received a quantity of electricity equal to the first threshold;

when the or at least one of the batteries has a state or partial charge above the second threshold, the or successively each of these batteries is supplied until it reaches a state of complete charge; and when the or at least one of the batteries has received a quantity of electricity above the first threshold and has a state of partial charge below the second threshold, the or successively each of these batteries is supplied with current until it reaches a state of partial charge equal to the second threshold.

6. Method according to claim 3, wherein, when the random power is available, the plant is controlled in such a way that, according to the following order of decreasing priorities:

when the or at least one of the batteries has a state of partial charge above the second threshold, the or successively each of these batteries is supplied with current until it reaches a state of complete charge;

when the or at least one of the batteries has received a quantity of electricity below the first threshold, the or successively each of these batteries is supplied with current until it has received a quantity of electricity equal to the first threshold; and when the or at least one of the batteries has received a quantity of electricity above the first threshold and has a state of partial charge below the second threshold, the or successively each of these batteries is supplied with current until it reaches a state of partial charge equal to the second threshold.

7. Method according to claim 3, wherein, when the random power is available, the plant is controlled in such a way that, according to the following order of decreasing priorities:

when the or at least one of the batteries has a state of partial charge above the second threshold, the or successively each of these batteries is supplied with current until it reaches a state of complete charge;

when the or at least one of the batteries has received a quantity of electricity above the first threshold and has a state of partial charge below the second threshold, the or successively each of these batteries is supplied with current until it reaches a state of partial charge equal to the second threshold; and when the or at least one of the batteries has received a quantity of electricity below the first threshold, the or successively each of these batteries is supplied with current until it has received a quantity of electricity equal to the first threshold.

8. Method according to claim 1, wherein, the plant comprising at least two batteries, in particular which are adapted to be connected in parallel one with respect to the other, after the two batteries or at least two of the batteries have reached a state of partial charge below a second predetermined threshold and when the random power is available, the plant is controlled in such a way that a single first of these batteries is supplied first until it reaches a state of partial charge equal to the second threshold.

9. Method according to claim 8, wherein, after the first battery has reached the second threshold and when the random power is available, the plant is controlled in such a way that the first battery and the or another of the batteries having a state of partial charge below the second threshold are supplied simultaneously.

10. Method according to claim 1, wherein, the plant comprising at least two batteries, in particular which are adapted to be connected in parallel one with respect to the other, when the random power is available and a delivery of current by the plant is requested, the plant is controlled in such a way that current is delivered simultaneously from all the batteries which are not in the charging phase.

11. Method according to claim 1, wherein, after the or one of the batteries has reached a state of zero charge and then goes to the state of complete charge, a quantity of electricity which the battery receives so as to go from the state of zero charge to a state of charge equal to a second predetermined threshold is measured.

12. Method according to claim 11, wherein the plant is controlled so as to reach the state of zero charge of the battery.

13. Method according to claim 1, wherein the or at least one of the batteries comprising at least two subassemblies current, at least two voltages in series are measured on the battery, each comprising a voltage across the terminals of a respective one of the subassemblies.

14. Method according to claim 1, wherein the battery or batteries are furthermore adapted to be supplied with electric current from a power source with temporally definite availability.

15. Electric power plant adapted to be associated with a power source with temporally random availability, the plant comprising at least one battery adapted to be supplied with electric current from the source, and control means for controlling the plant, wherein the control means controls the battery current supply, when the random power is available, so as to come as close as possible to a state of complete charge of the battery, and preferably to reach this state.

16. Plant according to claim 15, wherein, the plant comprising at least two batteries, in particular which are adapted to be connected in parallel one with respect to the other, the plant comprises means for disabling the delivery of current by any one of the batteries to the other or to any other of the batteries.

17. Plant according to claim 15, wherein the plant comprises four batteries.

18. A method of operating an electric power plant associated with a power source with temporally random availability, the plant comprising at least one battery adapted to be supplied with electric current from the source, said method comprising:

determining an effective capacity of said at least one battery in a state of complete charge;

measuring quantity of electricity entering said at least one battery during a charging phase; and controlling the electric current from the source to said at least one battery based on (1) the quantity of electricity entering the battery, and (2) the effective capacity of the battery.

19. The method according to claim 18, further comprising computing quantity of electricity which the at least one battery needs to receive in order to reach said state of complete charge.

20. The method according to claim 18, further comprising:

determining when the at least one battery has reached the state of complete charge based on the quantity of electricity entering the at least one battery and the effective capacity of the at least one battery; and disconnecting the at least one battery from the source when the state of complete charge is determined.

* * * * *